Dec. 16, 1941. W. A. HELSTEN 2,266,488
RING CYLINDER AND FLUID SEAL THEREFOR
Filed Aug. 15, 1940
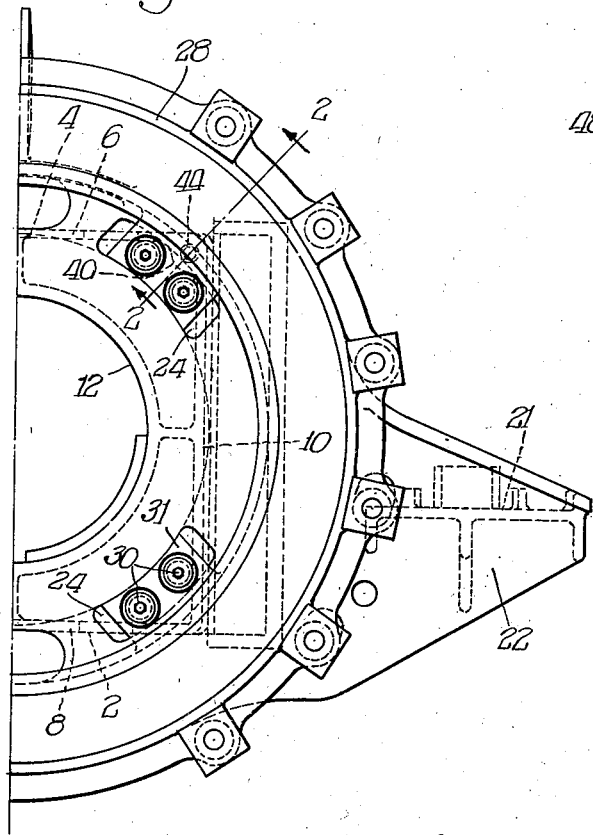
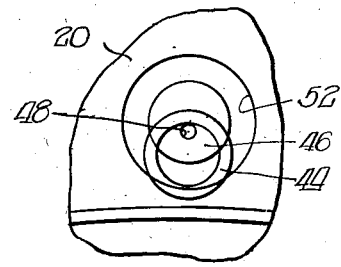
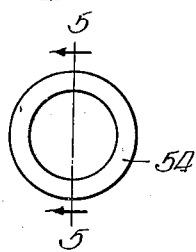
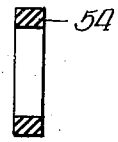
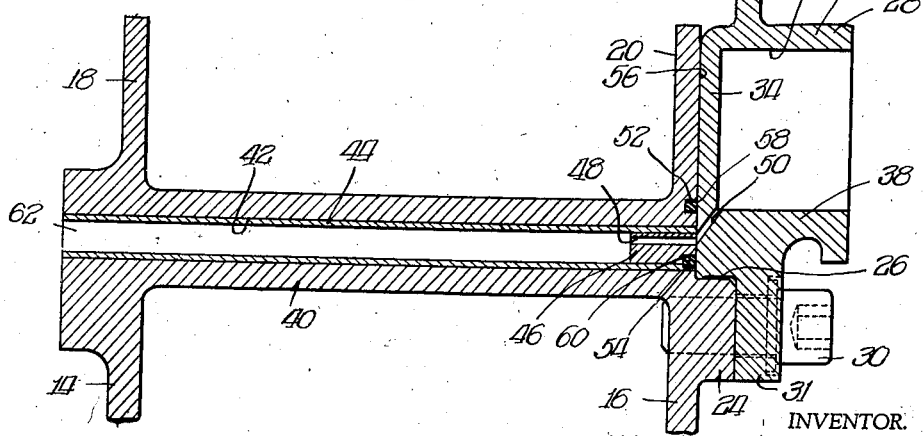
INVENTOR.
Wesley A. Helsten,
BY
atty.

Patented Dec. 16, 1941

2,266,488

UNITED STATES PATENT OFFICE 2,266,488

RING CYLINDER AND FLUID SEAL THEREFOR

Wesley A. Helsten, Chicago, Ill., assignor to American Steel Foundries, Chicago, Ill., a corporation of New Jersey Application August 15, 1940, Serial No. 352,760

12 Claims. (Cl. 188—153)

My invention relates to fluid pressure actuating means, and more particularly to a novel manner of affording a seal for an actuating fluid connection between a ring type fluid pressure cylinder and its supporting journal box through which a passageway is afforded for the actuating fluid.

Recent developments in railway brakes of the disc type include an arrangement wherein braking means such as rotors and stators and actuating means such as a ring cylinder are supported and operable between the wheel of a railway wheel and axle assembly and the journal box which supports a member of the truck frame. In such an arrangement it is apparent that limited space is available for connecting in a convenient and accessible place an air hose to the ring cylinder which is supported on the side of the journal box adjacent the wheel.

My invention contemplates affording a convenient connection for actuating fluid to a ring cylinder supported as above described and comprises a conduit extending through the journal box and having one end in alignment with a passageway in a ring cylinder and its other end located on the outer side of the journal box where an air hose may be conveniently connected therewith and easily accessible. A tight seal around the connection of said conduit with the passageway in the cylinder may be afforded by encircling said connection with a resilient member partially recessed in the journal box and compressed between said journal box and the cylinder as bolts securing said cylinder to the journal box are tightly drawn.

An object of my invention is to afford an accessible actuating fluid connection on one side of a journal box in which is afforded a passageway to a fluid pressure cylinder of ring type mounted on the other side thereof.

Another object of my invention is to afford a tight seal between the journal box and the cylinder for the connection of the conduits in said box and said cylinder through which the actuating fluid flows and to effectively maintain said seal by bolts which secure the ring cylinder to said journal box.

Referring to the drawing,

Figure 1 is a side elevation of a journal box and ring cylinder embodying my invention, only one-half of the journal box being shown inasmuch as the other half is similarly arranged, the view being taken from the inboard side thereof.

Figure 2 is a fragmentary sectional view of the structure shown in Figure 1, the section being taken substantially in a transverse plane indicated by line 2—2 of Figure 1.

Figure 3 is an enlarged fragmentary view of the inboard face of the journal box with the ring cylinder and the resilient ring 54 removed and shows the inboard end of the conduit which extends through said journal box.

Figure 4 is a side elevation of a sealing ring used in my novel invention, and Figure 5 is a sectional view thereof, said section being taken substantially in a diametrical plane indicated by the line 5—5 of Figure 4.

Describing my novel invention in greater detail, the journal box 2 may be of wing type and includes a rectangular box-section 4 having a top wall 6, a bottom wall 8, and side walls 10, 10. A central opening 12 in said box section receives a projecting end of an associated supporting axle (not shown) in well-known manner. Outboard and inboard walls 14 and 16 are afforded for said box-section, and outward and inboard vertical annular flanges 18 and 20, formed in substantially the same planes as the walls 14 and 16, encircle said box section. On each side of said journal box may be formed a wing portion 22 which affords seating and positioning means as at 21 for spring means supporting an associated truck frame member (not shown). Spaced around the inboard wall 16 may be arcuately shaped bearing pads 24, 24 affording precise and accurate seats as at 26, 26 for the ring cylinder 28 which may be secured to the inboard wall 16 by means of spaced bolts 30, 30 extending through spaced lugs 31, 31 on the inner circumference of said ring cylinder and in alignment with said bearing pads 24, 24. An annular fluid pressure chamber 32 in the ring cylinder 28 is defined by an annular wall 34, an outer circumferential wall 36, and an inner circumferential wall 38. Operable within the chamber 32 may be an associated ring type piston (not shown).

At the juncture of the top wall 6 and each side wall 10 of said journal box the metal section may be substantially thickened as at 40 so that a hole or opening 42 extending transversely of the journal box from the outboard wall to the inboard wall may be formed therethrough in any convenient manner such as by drilling. Sleeved within the hole 42 may be the pipe or tube 44, and the inboard end of said tube may be substantially closed in any convenient manner such as by brazing with any suitable metal 46. A conduit 48 of substantially smaller diameter than the inner diameter of the tube 44 may be drilled through the brazing metal 46. A diagonally arranged passageway or conduit 50 having a slightly greater diameter than the conduit 48 may be formed in the ring cylinder 28 and may be aligned with the conduit 48. Free passage of actuating fluid, such as air, through the journal box and cylinder into the pressure chamber 32 is thus afforded by the aligned tube 44 and conduits 48 and 50.

An air-tight seal may be afforded between the inboard wall 16 and flange 20 of the journal box and the wall 34 of the ring cylinder and may include an annular channel or recess 52 which encircles the conduit 48. The annular recess 52 may be concentric with the axis of the conduit 48 and seated within said recess may be an annular ring 54 of resilient material such as rubber composition. The resilient ring 54 may be of slightly greater depth than the depth of the recess 52 so that it normally projects slightly outward from the inboard face of the journal box. As the securing bolts 30, 30 are tightly drawn, the wall 34 of the ring cylinder 28 is forced into abutment with the inboard wall 20 of the journal box as at 56 and the resilient ring 54 is compressed so that a tight seal is afforded at the abutment of the cylinder wall 34 with the ring 54 as at 58, and a tight seal is also afforded as at 60 between the inner surface of the recess 52 and the ring 54. It is thus apparent that escape of actuating fluid between the journal box and the ring cylinder is substantially eliminated by the abutment of the resilient ring 54 at 58 and 60.

An easily accessible connection for the actuating fluid is afforded at the outboard end 62 of said tube 44 in any convenient manner. It will thus be apparent that I have afforded a novel manner of connecting fluid actuating means to a ring cylinder wherein simple and effective sealing means are provided between the ring cylinder and its supporting journal box, and wherein the actuating fluid connection to said cylinder is convenient and easily accessible.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In fluid pressure actuating means, a journal box having a longitudinally extending thickened portion with a conduit extending therethrough, a connection at one side of said journal box between said conduit and associated actuating fluid carrying means, a ring cylinder supported on the other side of said journal box and having a passageway aligned with the other end of said conduit and extending into a fluid pressure chamber, an annular recess in said journal box encircling the last-mentioned end of said conduit, and an annular resilient member seated in said recess and urged into tight abutment with said journal box and said cylinder as the bolts securing said cylinder to said journal box are tightly drawn.

2. In fluid pressure actuating means, a journal box having a longitudinally extending thickened metal section with a conduit extending therethrough, a connection at one side of said journal box between said conduit and associated actuating fluid carrying means, a ring cylinder supported on the other side of said journal box and having a passageway joining the other end of said conduit and extending into a fluid pressure chamber, an annular recess in said journal box encircling the last mentioned end of said conduit, and an annular resilient member seated in said recess and compressed between said journal box and said cylinder as the bolts securing said cylinder to said journal box are tightly drawn.

3. In fluid pressure actuating means, a journal box with a longitudinally extending thickened portion, a ring cylinder having a pressure chamber and supported on the inboard side of said box, passageways for actuating fluid extending through said portion and cylinder from the outboard side of said box to said chamber, and sealing means substantially preventing escape of fluid between said box and said cylinder from said passageways, said means comprising an annular recess on said box, a resilient ring seated in said recess and projecting outward therefrom, and members securing said cylinder to said box and maintaining said ring in tight abutment with said cylinder and with all the walls of said recess.

4. In fluid pressure actuating means, a journal box having an actuating fluid conduit extending from end to end of said box, a connection at one end of said conduit to actuating fluid, a ring cylinder supported on said journal box and having a passageway aligned with the other end of said conduit, and sealing means substantially preventing escape of fluid at the connection of said conduit and said passageway, said sealing means comprising an annular recess encircling said last-mentioned connection and an annular resilient member seated in said recess and having tight abutment with all the walls of said recess and said cylinder.

5. In fluid pressure actuating means, a ring cylinder having a fluid pressure chamber, a member supporting said cylinder, conduits extending through a longitudinally extending thickened portion of said member and said cylinder affording passage therethrough of actuating fluid into said chamber, and sealing means substantially preventing escape of fluid between said cylinder and said member from said passageways, said means comprising a resilient ring urged into tight abutment with said cylinder and said member as members securing said cylinder to said supporting member are tightly drawn.

6. In fluid pressure actuating means, a journal box having a thickened metal section along one corner thereof with a conduit extending therethrough, a ring cylinder supported on one side of said journal box and having a passageway aligned with the adjacent end of said conduit, resilient means engaging said journal box and said cylinder and encircling said conduit whereby a tight seal is afforded for preventing leakage of actuating fluid between said box and said cylinder, and a connection at the other end of said conduit to associated actuating fluid.

7. In fluid pressure actuating means, a journal member with a thickened metal portion extending longitudinally along one corner thereof, actuating means having a pressure chamber and supported at one end of said member, an actuating fluid connection at the opposite end of said member, a conduit extending through said portion and having connection with a conduit in said actuating means for passage of fluid through said conduits to said chamber, and sealing means for said last-mentioned connection including a ring of resilient material surrounding said connection and compressed between said means and said member.

8. In fluid pressure actuating means, a journal box having a thickened metal section along one corner thereof with a conduit extending therethrough, a ring cylinder supported on one side of said journal box and having a passageway aligned with the adjacent end of said conduit, resilient means abutting said journal box and said cylinder and encircling the end of said conduit to substantially eliminate leakage of actuating fluid between said box and said cylinder, and a connection at the other end of said conduit to said actuating fluid.

9. In fluid pressure actuating means, a supporting member with a longitudinally extending thickened portion, a fluid pressure cylinder mounted on said member, a conduit extending through said portion and having a connection with a passageway to a pressure chamber in said cylinder, an annular resilient member compressed between said cylinder and said member and surrounding said connection, and means securing said cylinder to said first-mentioned member and maintaining said resilient member in tight abutment with said member and said cylinder.

10. In fluid pressure actuating means, a journal box having a thickened metal section extending along one corner thereof with a conduit extending therethrough, a connection at one side of said box between actuating fluid and the adjacent end of said conduit, power means supported on the opposite side of said box and having a passageway aligned with the other end of said conduit, and resilient means tightly engaging said journal box and said power means and surrounding the last-mentioned end of said conduit to substantially eliminate leakage of actuating fluid between said power means and said box.

11. In fluid pressure actuating means, a journal box having a thickened metal section extending along one corner thereof with a conduit extending therethrough, a connection at one side of said box between actuating fluid and the adjacent end of said conduit, power means supported on the opposite side of said box and having a passageway aligned with the other end of said conduit, an annular recess encircling the last-mentioned end of said conduit, and annular resilient means within said recess in tight abutment with said journal box and said power means for substantially preventing leakage of actuating fluid.

12. In fluid pressure actuating means, a journal box having a thickened metal section along one corner thereof with a conduit extending therethrough, a ring cylinder supported on one side of said journal box and having a passageway aligned with the adjacent end of said conduit, resilient means between said journal box and said cylinder and encircling the end of said conduit to substantially eliminate leakage of actuating fluid between said box and said cylinder, a connection at the other end of said conduit to said actuating fluid, and means for compressing said resilient means into tight engagement with said journal box and said cylinder.

WESLEY A. HELSTEN.